(12) United States Patent
Curry et al.

(10) Patent No.: US 8,346,658 B1
(45) Date of Patent: Jan. 1, 2013

(54) LINE OF CREDIT WITH PRE-AGREED LINE INCREASES

(75) Inventors: Lisa D. Curry, Warwick, RI (US); Cherie A. Arruda, Winchester, MA (US); James D. Heisterkamp, Jr., Auburn, CA (US); Donna L. Nicholson, Hanson, MA (US); Ryan Gene Ritz, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 224 days.

(21) Appl. No.: 12/110,523

(22) Filed: Apr. 28, 2008

(51) Int. Cl.
*G06Q 40/00* (2006.01)

(52) U.S. Cl. .................... 705/38; 705/4; 705/7; 705/35; 705/36 R; 705/40; 705/412; 717/177

(58) Field of Classification Search .................. 705/4, 7, 705/35, 36 R, 38, 40, 412; 717/177
See application file for complete search history.

(56) References Cited

U.S. PATENT DOCUMENTS

| | | | | |
|---|---|---|---|---|
| 7,324,970 | B2 * | 1/2008 | Magruder et al. ............... | 705/38 |
| 2002/0099650 | A1 * | 7/2002 | Cole ............................... | 705/38 |
| 2002/0166117 | A1 * | 11/2002 | Abrams et al. ................. | 717/177 |
| 2003/0130934 | A1 * | 7/2003 | Saunders ......................... | 705/38 |
| 2003/0149656 | A1 * | 8/2003 | Magruder et al. ............... | 705/38 |
| 2005/0033618 | A1 * | 2/2005 | Rexius .............................. | 705/7 |
| 2005/0086085 | A1 * | 4/2005 | Berlin et al. ....................... | 705/4 |
| 2005/0144126 | A1 * | 6/2005 | Commodore et al. .......... | 705/40 |
| 2005/0177490 | A1 * | 8/2005 | Pembroke ....................... | 705/38 |
| 2005/0216384 | A1 * | 9/2005 | Partlow et al. .................. | 705/35 |
| 2006/0010056 | A1 * | 1/2006 | De La Motte ................... | 705/35 |
| 2006/0224480 | A1 * | 10/2006 | Bent et al. ....................... | 705/35 |
| 2007/0150409 | A1 * | 6/2007 | Petralia ........................... | 705/38 |
| 2007/0288356 | A1 * | 12/2007 | Gujral et al. .................... | 705/38 |
| 2008/0091626 | A1 * | 4/2008 | Kremen ......................... | 705/412 |
| 2008/0249953 | A1 * | 10/2008 | Sinha et al. ................. | 705/36 R |

* cited by examiner

*Primary Examiner* — Mary Cheung
*Assistant Examiner* — Sanjeev Malhotra
(74) *Attorney, Agent, or Firm* — Michael A. Springs; Moore and Van Allen, PLLC; Nicholas C. Russell

(57) ABSTRACT

A line of credit with pre-agreed line increases is described. In example embodiments, the line of credit is secured by a residence, and the borrower can agree at initial closing to periodic line increases, so that additional closings and re-recording are not necessary. Modeling can be used by the financial institution to determine if and when to offer increases in the LOC. An automated servicing routine is then used to produce a recommendation with respect to increasing the LOC loan amount. This automated servicing routine includes at least one model to produce the recommendation. The line of credit can be increased if and when recommended by the servicing platform.

11 Claims, 3 Drawing Sheets

LINE OF CREDIT WITH PRE-AGREED LINE INCREASES

BACKGROUND

A mortgage is a traditional financial product that allows a person or persons to finance or re-finance the purchase of a home. A home equity loan is another financial product that allows a home owner to obtain funds by mortgaging the value of his or her existing home, or at least the equity in the home. A home equity loan can be obtained from a financial institution by the home owner, who may be referred to by the financial institution as a "customer" or "borrower." The customer takes out the loan and a lien is placed on the home by the financial institution so that the loan is secured by the equity in the home. As with a mortgage, the borrower makes payments with interest to the financial institution for the life of the loan.

The loan may be taken out as a lump sum, or may be set up as a line of credit, where the borrower draws on the line as money is needed. In the case of the line of credit, monthly payments are adjusted accordingly for the outstanding balance at any given time. Such a line of credit is some times referred to as an "LOC" or, because it is based on home equity, as a home equity LOC or "HELOC." The amount of the loan, or the size of the line of credit is calculated as a percentage of the value of the equity in the borrower's home, and this percentage is commonly referred to as the loan-to-value (LTV) ratio or percentage, or simply as the "LTV." This percentage might also be referred to as the "combined loan to collateral value ratio" (CLTV) if there is more than one loan secured by the property. If a customer needs additional funds, the customer can apply for an increase in the maximum amount of funds available from the LOC, which can then be approved and closed in much the same manner as a new loan is approved and closed, with any required re-recording of the lien. Whether such an increase also amounts to an increase in the LTV ratio for the loan depends on the current value of the residence securing the loan.

SUMMARY

Embodiments of the present invention provide for a line of credit secured by a residence in which the borrower can agree at initial closing to periodic line increases, so that a new application and re-recording are not necessary. In example embodiments, an LOC loan is established with closing documents including an opt-in, future advance provision that provides for pre-agreed increases in the LOC loan amount without re-recording papers signed by the borrower. (The original LOC is created.) These closing documents can be generated after the borrower has received the appropriate disclosures and has made a decision to opt in to the provision of pre-agreed increases. An automated servicing routine can then be used to produce a recommendation with respect to increasing the LOC loan amount. This automated servicing routine can include at least one model to produce the recommendation. Increases in the LOC loan amount can then be offered selectively to the borrower, that is offered in accordance with or when recommended by the automated servicing routine, or as otherwise determined by the financial institution based on normal business considerations. In at least some embodiments, an increase must be accepted by the borrower before the increase takes effect.

In some embodiments, a plurality of models is used together as part of the automated servicing routine to determine if and when to offer customers an increase in the LOC amount. This plurality of models can include a utilization model, a credit cube model, and a capacity-to-pay model. These models accept as input, various variables. As one example, the utilization model can make use of variables including: months since last advance, amount of first home loan, open revolving utilization, days since first mortgage open, home equity LOC (HELOC) risk rating, HELOC balance, HELOC utilization, days since first enrolled in on-line banking, and the total amount of credit card charges for cycle.

In example embodiments, one or more instruction execution platforms and/or computer systems can be used to carry out the invention. These computing platforms and appropriate computer program code instructions can be used to implement a fulfillment system to generate closing documents, as well as the servicing platform that executes the models as part of the automated servicing routine. These systems, as appropriate, can store a flag value that indicates whether the LOC includes the provision for pre-agreed line increases. The system to service an LOC can include computer program code for executing the models to facilitate producing a recommendation with respect to increasing an LOC loan amount, and an instruction execution platform for using the plurality of models in an automated servicing routine to recommend and provide increases in the LOC loan amount.

DETAILED DESCRIPTION OF THE INVENTION

The following detailed description of embodiments refers to the accompanying drawings, which illustrate specific embodiments of the invention. Other embodiments having different structures and operation do not depart from the scope of the present invention.

The detailed example embodiments presented herein are based on a financial institution such as a bank offering a home equity line of credit (HELOC) product to its customers and/or borrowers. The invention can be applied by other types of lenders and can be applied to varied loan products. The term "bank" and any similar terms, such as "financial institution" are used herein in their broadest sense. Financial institutions that process loans and documents of the types discussed can include stock brokerages, credit unions, and other types of institutions which are not strictly banks in the historical sense. The use of terms such as bank, "financial institution", "lender", or the like herein is meant to encompass all such possibilities. Also, the use of the term "home equity" as applied to a line of credit described herein is intended to encompass any and all traditional loans secured by real property.

Figure 1:
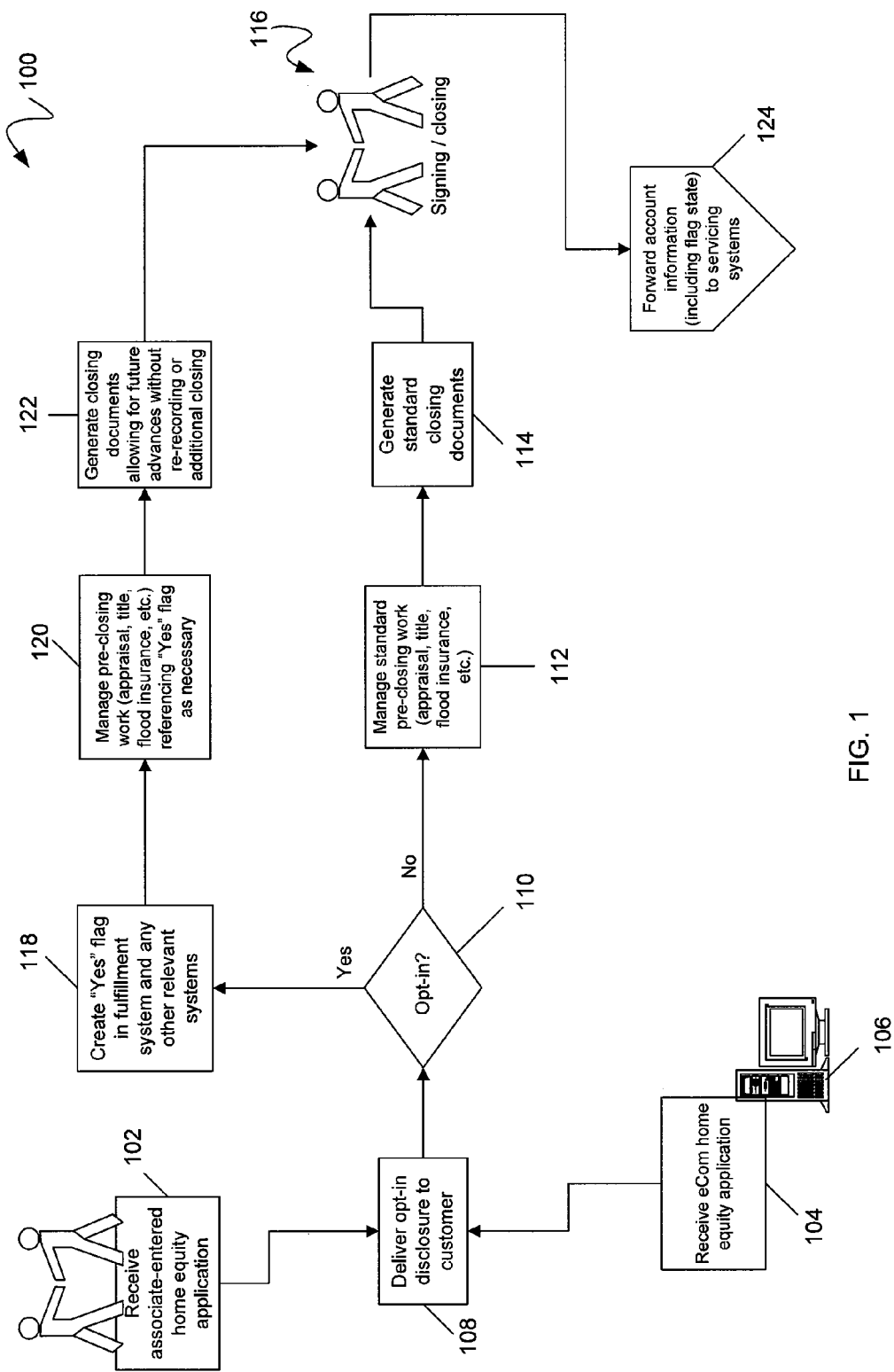
FIG. 1 is a flowchart illustrating a loan application and closing process according to example embodiments of the invention.

FIG. 1 illustrates the process of originating a HELOC with the provision for opting in to pre-agreed line increases according to example embodiments of the present invention. FIG. 1 illustrates the process in flowchart form. Like most flowcharts the process is shown as a series of process or subprocess blocks. Origination process 100 of FIG. 1 in this example begins when a home equity LOC application is input to the financial institution's systems. This input can occur because an associate (employee, agent, contractor, or the like) of the financial institution collects information from the borrower and inputs information as shown at block 102, or the customer submits an application through an eCommerce system via the World Wide Web as shown at block 104, using a computer system or workstation, 106. At block 108, appropriate "opt-in" disclosure documents are either physically or electronically delivered to the customer for review so that the borrower can make an informed decision on whether to accept the pre-agreed increase provision.

The opt-in disclosure describes the features of the HELOC to the customer. In at least some embodiments, these features include but are not limited to the customer receiving a periodic letter informing them of the status of their account, as well as, if eligible, a proposed line increase for which the customer is pre-approved. Customers who receive a pre-approved offer to increase their existing HELOC will only need to accept the offer for the account credit limit to be increased to the offered limit. If they do not respond, the account credit limit goes unchanged. The offer could be received in other ways as well, for example, via a telephone call, Email, or text message, such as on a mobile phone.

Still referring to FIG. 1, if the customer does not opt in at decision block 110, the standard pre-closing work, including title, appraisal, and flood insurance evaluations are carried out at block 112. Standard closing documents are generated at block 114, and signing and closing take place as shown at 116, including recording of the lien. If the customer however does choose to opt in to the pre-agreed line increase option at decision block 110, a stored flag in the fulfillment and other bank systems is set to indicate a "yes" at block 118. Pre-closing work, including title, appraisal, and flood insurance evaluations are carried out at block 120, with reference to the fact that the customer has "opted in" to the pre-agreed line increases as indicated by the stored flag previously mentioned. Closing documents are generated at block 122. In this instance, the closing documents allow for future advances or increases in the LOC amount without re-recording or additional closings. The loan is closed at block 116, and in either case, the appropriate account information is forwarded to account servicing and other systems within the financial institution as necessary at block 124.

In order to allow for the future advances of an LOC loan when a customer has opted in to the provision, a security instrument with future advance provisions is created. As an example, the instrument could specify both an initial line of credit and a maximum line of credit. These amounts could be specified in terms of either dollar amounts, or as a percentage of the value of the real property. The instrument can be set up to allow a memorandum of additional advance to be appended to a deed of trust without requiring new papers to be signed by the borrower and recorded. In some cases it may be necessary for the financial institution to check and make sure no intervening liens have been recorded prior to offering an increase. It may also be necessary to use a modification process to notify taxing authorities of the increased lien in mortgage tax jurisdictions.

Figure 2:
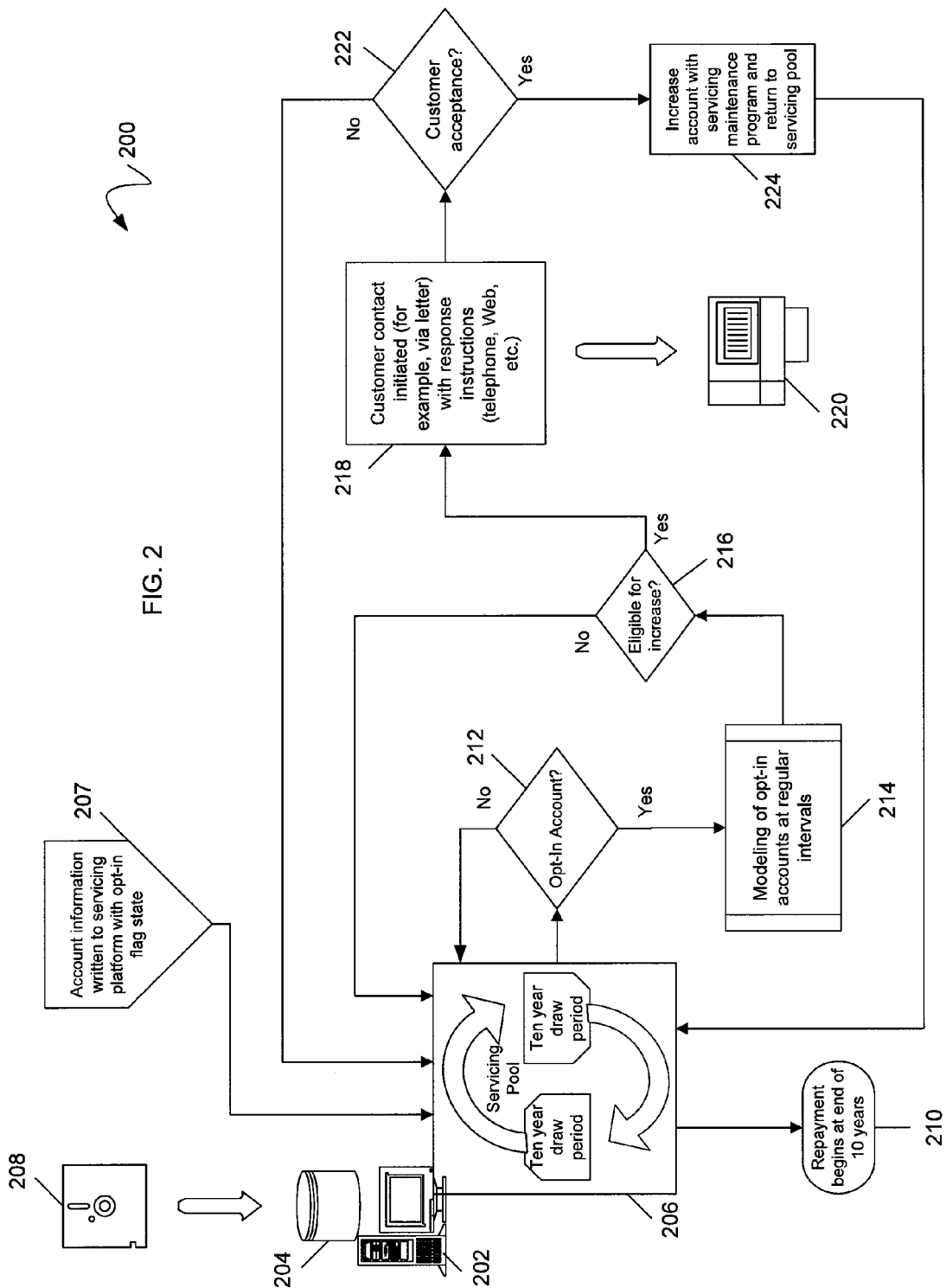
FIG. 2 is combination block diagram and flowchart illustrating the servicing of an LOC loan according to example embodiments of the present invention.

FIG. 2 is a combination block diagram and flowchart that illustrates the operation of the servicing routines and the servicing platform, 200, with example embodiments of the invention. Computer system or instruction execution platform 202 includes storage medium 204 and manages a pool of loans, 206, information for which is received at block 207 and stored on the storage medium along with any necessary computer program code. The computer program code to run the servicing platform can also reside on removable media, such as removable disk 208. In this example, as indicated in the drawings, the servicing pool of loans corresponds to a HELOC product with a revolving ten year draw period. Repayment begins at the end of ten years as indicated at block 210.

Figure 3:
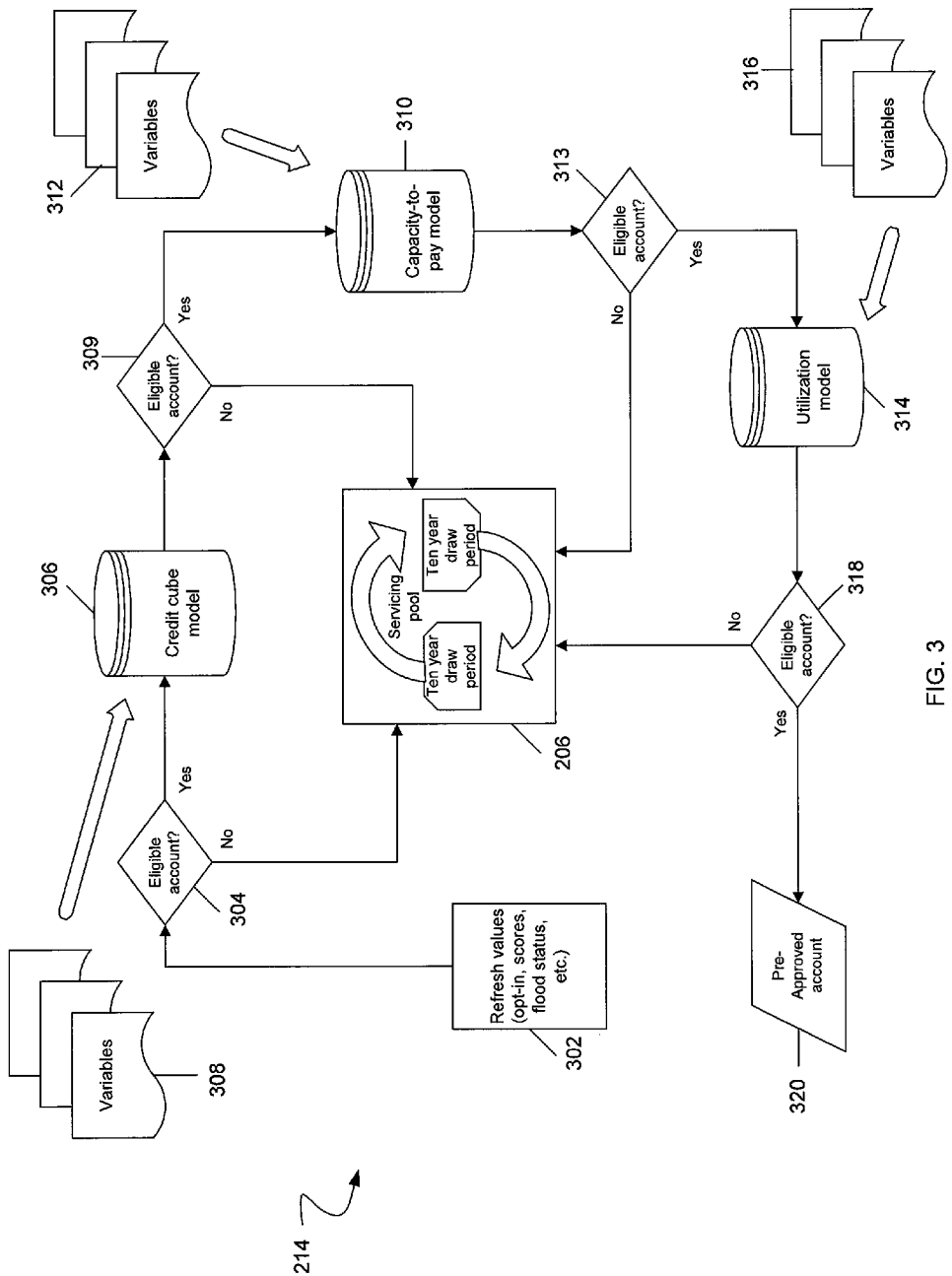
FIG. 3 is a combination block diagram and flowchart illustrating the operation of the models used in the automated servicing routine of an example embodiment of the invention.

As indicated by decision block 212 of FIG. 2, accounts in the pool are constantly being serviced. When an account is an opt-in account, and an appropriate review interval has passed, the process of FIG. 2 proceeds to block 214, where the account is run through a series of modeling routines to obtain a recommendation as to whether to offer an LOC amount increase. The interval with which accounts are reviewed can be selected by the financial institution according to normal business considerations. As an example, an initial review at six months from the initial closing and monthly reviews thereafter can be selected. The process of reviewing accounts as shown in FIG. 2, and modeling accounts as shown in FIG. 3 would typically be conducted for large numbers of accounts on an ongoing basis. For clarity, these figures and the discussion herein is framed in terms of how a single account is handled.

Still referring to FIG. 2, a determination is made at decision block 216 as to whether an account is eligible for a pre-agreed line increase. In example embodiments, this determination is based on a recommendation from the models. If the account is not eligible, the account returns to its monitored status. If the account is eligible, a customer contact is initiated to offer the increase to the customer at block 218. In some embodiments, this contact could take the form of a mailing, for example a letter printed on a printer such as printer 220. The customer contact could also be initiated electronically. If the customer accepts the offer at decision block 222, the increase is entered in the appropriate account servicing and maintenance system at block 224. In either case, the account returns to a monitoring status.

FIG. 3 is a combination block diagram and flowchart that illustrates a portion of an example automated servicing routine that makes use of a plurality of models to produce a recommendation on offering a pre-agreed line increase so that the increase can be provided in accordance with the recommendation. FIG. 3 illustrates further detail of block 214 of FIG. 2. In the process of FIG. 3, stored values are refreshed for the loan at block 302 prior to running the models. These values can include credit bureau data and credit scores for the borrower as well as flood hazard status and a value for the property. Other values can be included as business needs dictate. A determination is made at decision block 304 as to whether the account is still eligible for the pre-agreed line increase using filtering based on the refreshed values. If the account is not eligible, the account returns to a monitoring status at block 206. If the account is eligible, credit cube model 306 is run. The credit cube modeling routine is stored on a storage medium in the servicing platform or a connected instruction execution system, and accepts variables 308 as input. Details of the credit cube model as well as the other models shown in FIG. 3 are presented below.

Still referring to FIG. 3, a determination is made at decision block 309 as to whether the account has been recommended for and is therefore still eligible for the pre-agreed line increase based on the credit cube model. If the account is not eligible, the account returns to a monitoring status at block 206. If the account is eligible, capacity-to-pay model 310 is run. The capacity-to-pay modeling routine is stored on a storage medium in the servicing platform or a connected instruction execution system, and accepts variables 312 as input. A determination is made at decision block 313 as to whether the account has been recommended for and is therefore still eligible for the pre-agreed line increase based on the capacity-to-pay model. If the account is not eligible, the account returns to a monitoring status at block 206. If the account is eligible, utilization model 314 is run. The utilization modeling routine is stored on a storage medium in the servicing platform or a connected instruction execution system, and accepts variables 316 as input. A determination is made at decision block 318 as to whether the account has been recommended for and is therefore still eligible for the pre-agreed line increase based on the utilization model. If the account is not eligible, the account returns to a monitoring status at block 206. If the account is eligible, the account is eligible according to the plurality of models, and the line increase offer is recommended—the account becomes a pre-approved account at block 320, meaning it is pre-approved for a line increase, which will take effect if and when accepted by the customer.

The credit cube model referred to above evaluates borrower credit bureau and application data to create a risk level associated with the lending of the increased amount. The risk level can then be used in the setting of the combined loan to value ratio (CLTV) and debt to income (DTI) maximums, as well as, the maximum amount allowed on the HELOC. The model was developed using software known as "Model Builder for Decision Trees"™, which is a product of the well-known Fair, Isaac & Company, Inc. ("FICO"); the same company that produces credit scoring products that are widely used in the lending industry. Model Builder for Decision Trees makes use of a statistical modeling technique known as classification and regression trees ("CART"). With this type of statistical modeling, various input values or variables define levels at which a population of accounts are separated.

There are four "levels" in the credit cube model used in the example embodiment of FIG. 3. The hierarchy the first two levels can be determined by normal business practices and selected by a model builder of skill in the art. The second two levels and the measurement breaks for a level are selected by the Model Builder for Decision Trees ("Decision Trees") product, which, in one example, can use an "ever-sixty-plus days" past due performance variable for the accounts in a given sample population. The Model Builder for Decision Trees product selected the break for the second level and selected the two most predictive characteristics for the last two levels out of approximately eighty given characteristics provided by the builder.

The values that define the four levels of this model are the household deposit relationship, the combined loan to value (CLTV), the next generation FICO score, and a custom home equity score. The household deposit relationship amount is the first level. In at least some embodiments, the model builder uses the same segmentations as used in a custom credit scorecard for the portfolio of customer deposit accounts. The combined loan to collateral value (CLTV) is the second level in this example. The Decision Trees product determines where the CLTV breaks should be for each deposit relationship. The "next generation" FICO credit score has been determined in at least some embodiments to be a good predictor of "ever-sixty-plus days" past due delinquency, and can be used for the third level of the model. The Decision Trees product selects the breaks for the FICO score. The value may be different for the different branches as there may be different populations in each branch. Finally, a custom score can be used for the fourth level, and can be a good predictor of the ever-sixty-plus days past due delinquency, at this level. The Decision Trees product selects the breaks for the custom score. The value may differ for the different branches as there may be different populations in each branch.

A custom credit score as referred to above is a score (model) that is developed using information from customers who applied for the product at a particular institution. For example a home equity custom score for a particular bank is built using information on applicants that applied for a home equity product at that bank and were either declined or booked. A custom score is therefore usually more predictive for the institution than the FICO score, as the custom score is specific to the institution's applicants, rather than the national population on which the FICO score is developed. The "ever-sixty-plus days" past due variable mentioned above is an industry standard performance variable to determine if an applicant is "good" or "bad" from a credit-worthiness perspective to allow the model to predict future performance. If a customer in the sample being used to develop/build the model has ever been sixty days past due or worse, even if that customer has now recovered and is current, the customer would be considered "bad" when using an "ever-sixty-plus days" performance variable.

The capacity-to-pay model in the example of FIG. 3 evaluates applicant credit bureau data to determine a maximum debt-to-income ratio based on an assigned risk profile. In example embodiments, the possible risk profile values are: very low risk; low risk; medium risk; high risk; and very high risk. In parallel, the model determines when income verification would be required, as with some risk profiles, verification of income would by typical. If verification of income would normally be required, the applicant may not be a good candidate for the pre-agreed line increases, since requiring such verification of income would negate some of the advantages of the automatic pre-agreed line increases. It would be possible however, to design and embodiment where the process of verifying income was streamlined, perhaps, for example, requiring only submission of a supporting document with the borrower's response to the line increase letter. In such a case, the pre-agreed line increases according to embodiments of the invention could still be implemented. With such an embodiment, verification of income (VOI) is used to determine whether an applicant has sufficient capacity to repay a requested loan amount prior to actually implementing a line increase.

The capacity-to-pay model in example embodiments was also developed using the Model Builder for Decision Trees product. The hierarchy of the mitigator levels and the data characteristics to be analyzed by the model can be determined taking into account normal business practices by a model builder of skill in the art. The best metric or measurement breaks (i.e., >30%, <=30%) for a level can be selected by the Decision Trees product and used to predict an "ever-sixty-plus-days" past due account in the given sample population. In addition, the model also selects the most predictive characteristics for the last four levels out of approximately sixty given characteristics that would typically be provided by the model builder. The levels for the capacity-to-pay model are listed below.

Level 1: Two parts—Part 1, thin file or sufficient trades—whether there is sufficient credit data. Part 2, the customer must be "credit conforming," i.e., the customer has a score that qualifies (is high enough) and has a credit history that passes credit policy.

Level 2: Payment-to-income (proposed home equity payment to total combined monthly income)—using paymentto-income in the second level removes non-qualifying applicants from the credit conforming population, regardless of the dollar amount of the loan.

Level 3: Amount requested—using amount requested for the third level removes the non-qualifying applicants above a particular dollar amount for the loan.

Level 4: Primary and joint revolving utilization (ratio between, credit limits and balances)—This level represents the start of the actual model, all mitigators (subset populations that ideally should not be in the model) have been removed in the prior three nodes. The Decision Trees package has been found to at least at times pick revolving utilization as the most predictive characteristic from a list of approximately sixty data characteristics provided for the package to choose from.

Level 5: FICO score minimums—the Decision Trees package has been found to at least at times pick FICO score minimums as the next most predictive characteristic from the list of approximately sixty data characteristics provided for the package to choose from, for the group of applicants that fall into this particular branch of the decision tree. The value may be different for the different branches as there may be different populations in each branch.

Level 6: Average trade age—the Decision Trees package picked average trade age as the next most predictive characteristic from the list of approximately sixty data characteristics provided for the package to choose from, for the group of applicants that fall into that particular branch of the decision tree. The value may be different for the different branches as there may be different populations in each branch.

The goal of the utilization model of the example of FIG. 3 is to predict the likelihood of HELOC account holders responding to a line-increase and actually spending funds from the HELOC. Positive incremental balance and incremental net interest income are also considered. Targeting those likely to respond to a line increase letter will generate better incremental balance and incremental net interest income for the financial institution than not using the model or using a segmentation approach. Unlike the other models in the example of FIG. 3, which used an off-the-shelf modeling product based on CART techniques, the utilization model is a logistic regression. Customers who are likely to respond to an increase offer include HELOC customers that have recently used their account, have a large CRE loan, have highly utilized their lines, have higher than average balances, have higher than average experience as online banking users, and are credit card users. To select these customers, a logistic regression is run using the variables in the following table as input. With each variable, a notation as to whether it has a positive or negative correlation with utilization is indicated. If data for a variable is not available for any reason, an appropriate replacement value can be used, for example, the mean or median value for that variable relative to the population of account holders.

| VARIABLE DESCRIPTION | DIRECTION |
|---|---|
| Months since last HELOC advance date | − |
| The amount of the first home loan | + |
| Open revolving utilization | + |
| Days since first mortgage open at the financial institution | − |
| HELOC risk rating code | N/A |
| HELOC balance (variable part) | + |
| HELOC account utilization | + |
| Days since borrower first enrolled in online banking | + |
| Total amount of customer's credit card charges with the financial institution assessed for the current cycle | + |

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-readable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, action, or portion of code, which comprises one or more executable instructions or actions for implementing the specified logical function(s). It should also be noted that, in some alternative implementations, the functions noted described herein may occur out of the order presented, depending upon the functionality involved. It will also be noted that each block of the block diagrams and/or flowchart illustrations, and combinations of blocks in the block diagrams and/or flowchart illustrations, can be implemented by special purpose hardware-based systems or operators which perform the specified functions or acts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Additionally, comparative, quantitative terms such as "above", "below", "less", "greater", are intended to encompass the concept of equality, thus, "less" can mean not only "less" in the strictest mathematical sense, but also, "less than or equal to."

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A non-transitory computer-readable storage medium comprising computer program code for providing a home-equity based line of credit (LOC) loan to a borrower, the computer program code further comprising:

instructions for producing closing documents establishing the LOC loan, the closing documents including a provision that provides for a pre-agreed increase in the LOC loan amount without re-recording papers signed by the borrower, wherein the borrower is not provided the LOC loan increase at the time of producing closing documents, but is authorized for the pre-agreed increase in the LOC loan at a future time;

instructions for refreshing stored values associated with LOC loans that include the provision that provides for the pre-agreed increase in the LOC loan amount, wherein the stored values include credit bureau data and property value data;

instructions for running at least one model from a plurality of models on LOC loans that are eligible for pre-agreed increases, wherein eligibility is based at least in part on the refreshed stored values, wherein the models provide a recommendation as to whether the LOC loan is in position to receive the pre-agreed increase in the LOC loan;

and instructions for offering the pre-agreed increase in the LOC loan amount to the borrower selectively, based at least in part on the stored values and recommendations from the plurality of models, wherein upon acceptance of the pre-agreed increase in the LOC loan amount pre-agreed increase in the LOC loan amount is provided to the borrower without re-recording or re-applying for a second LOC loan and/or an increase in the LOC loan.

2. The computer readable storage medium of claim 1 wherein the computer program code further comprises:

instructions to facilitate contacting the borrower to enable the borrower to opt in to the provision that provides pre-agreed line increases; and instructions to facilitate receiving a response from the borrower with respect to the provision that provides pre-agreed line increases.

3. The computer readable storage medium of claim 2 wherein the computer program code further comprises instructions to facilitate initiating contact with the borrower to obtain acceptance of the increase in the LOC loan amount.

4. The computer-readable storage medium of claim 1 wherein the at least one model comprises a utilization model.

5. The computer readable storage medium of claim 4 wherein the utilization model makes use of a plurality of variables comprising months since last advance, amount of first home loan, open revolving utilization, days since first mortgage open, home equity LOC (HELOC) risk rating, HELOC balance, HELOC utilization, days since first enrolled in on-line banking, and total amount of credit card charges for cycle.

6. The computer-readable storage medium of claim 4, wherein the utilization model determines a recommendation for increasing the LOC loan amount by predicting a likelihood of the borrower responding to the pre-agreed increase in the LOC loan amount and spending funds from the pre-agreed increase.

7. The computer-readable storage medium of claim 1 wherein the at least one model comprises a capacity-to-pay model, wherein the capacity-to-pay model further comprises borrower credit bureau data to determine an assigned risk profile.

8. The computer-readable storage medium of claim 7, wherein the capacity-to-pay model determines a recommendation for increasing the LOC loan amount by evaluating borrower credit bureau data to determine a maximum debt-to-income ratio of the borrower.

9. The computer readable storage medium of claim 1 wherein the at least one model comprises a credit cube model, wherein the credit cube model further comprises a household deposit relationship, a combined loan to value ratio, a next generation FICO score, and a custom home equity score.

10. The computer readable storage medium of claim 1 wherein the computer program code further comprises instructions to facilitate initiating contact with the borrower to obtain acceptance of the increase in the LOC loan amount.

11. The computer readable storage medium of claim 1 wherein the recommendation produced with respect to increasing the LOC loan amount is dependent on:

a credit-cube model that evaluates borrower credit bureau and application data to create a risk level associated with lending of the pre-agreed increased;

a capacity-to-pay model that evaluates borrower credit bureau data to determine a maximum debt-to-income ratio of the borrower;

a utilization model that predicts a likelihood of the borrower responding to the pre-agreed increase in the LOC loan amount and spending funds from the pre-agreed increase; and wherein the recommendation is made to increase the LOC loan amount when the risk level is met, the maximum debt-to-income ratio is met, and the likelihood of the borrower responding to the pre-agreed increase in the LOC loan amount and spending the funds is met.

\* \* \* \* \*